United States Patent [19]
Rose

[11] Patent Number: 5,623,261
[45] Date of Patent: Apr. 22, 1997

[54] METHOD AND SYSTEM FOR TRANSLATING KEYED INPUT WITHIN A DATA PROCESSING SYSTEM

[75] Inventor: Robert A. Rose, Delray Beach, Fla.

[73] Assignee: International Business Machines Corporation, Armonk, N.Y.

[21] Appl. No.: 422,969

[22] Filed: Apr. 17, 1995

[51] Int. Cl.[6] ................................................ H03M 11/00
[52] U.S. Cl. .......................... 341/26; 341/20; 364/708.1; 345/172
[58] Field of Search ................................... 341/20, 22, 23, 341/26; 345/172; 400/477; 364/708

[56] References Cited

U.S. PATENT DOCUMENTS

| | | |
|---|---|---|
| 4,633,227 | 12/1986 | Menn . |
| 4,823,311 | 4/1989 | Hunter ........................ 341/23 |
| 4,844,637 | 7/1989 | Buisson et al. . |
| 4,853,888 | 8/1989 | Lata et al. . |
| 4,879,557 | 11/1989 | Roche ........................ 341/23 |
| 5,101,201 | 3/1992 | Chei . |
| 5,144,567 | 9/1992 | Oelsch et al. . |
| 5,280,283 | 1/1994 | Raasch et al. . |
| 5,387,042 | 2/1995 | Brown ...................... 400/477 |
| 5,402,121 | 3/1995 | Noorbehesht ............. 341/26 |
| 5,450,078 | 9/1995 | Silva ........................ 341/26 |

OTHER PUBLICATIONS

Rowlance, E.J., IBM Technical Disclosure Bulletin, vol. 30 No. 11, Apr. 1988, pp. 127–132.

Primary Examiner—Thomas Mullen
Assistant Examiner—Albert K. Wong
Attorney, Agent, or Firm—Mark S. Walker; Andrew J. Dillon

[57] ABSTRACT

A method and system are disclosed for processing input to a data processing system having a memory and an input device having a number of keys which represent associated characters and functions. According to the method of the present invention, a translation table is created within the memory for translating virtual key codes, which specify relative positions of associated keys, into corresponding input codes, which specify a character or function. The translation table enables virtual key codes to be translated into character codes independently of the operating system and input device utilized by the data processing system. In response to the detection of a selection of a key of the input device, a scan code representing the selected key is determined. The scan code representing the selected key is then converted into a virtual key code, which is translated into an input code utilizing the translation table. The input code is thereafter received for processing within the data processing system. Because the translation table converts virtual key codes into input codes independently of the operating system and input device utilized by the data processing system, the translation table may be utilized by a number of data processing systems having diverse operating systems and input devices.

13 Claims, 5 Drawing Sheets

| Keyword | Meaning |
|---|---|
| accent | a specified accent mark |
| alt | character or function definition when either "Alt" key pressed |
| base | character or function definition when unshifted key pressed |
| caps | character or function definition when "Caps Lock" key pressed |
| ctrl | character or function definition when "Cntl" key pressed |
| #define | assign a numeric value to a given label |
| graph | character or function definition when "Alt/Gr" key pressed |
| include | includes other source file into the file being processed |
| key | a definition statement of a virtual key code |
| lalt | character or function definition when left "Alt" key pressed |
| layer | defines active layer of country layout |
| layout | keyword identifier at the top of a layout file |
| lctrl | character or function definition when left "Cntl" key pressed |
| lshift | character or function definition when left "Shift" key pressed |
| nocaps | selects unshifted definition when "Caps Lock" & "Shift" pressed |
| nonum | utilize non-numeric base definition of ten-key pad |
| num | utilize numeric base definition of ten-key pad |
| ralt | character or function definition when right "Alt" key pressed |
| rctrl | character or function definition when right "Ctrl" key pressed |
| rshift | character or function definition when right "Shift" key pressed |
| shift | character or function definition when either "Shift" key pressed |

*Fig. 6*

METHOD AND SYSTEM FOR TRANSLATING KEYED INPUT WITHIN A DATA PROCESSING SYSTEM

BACKGROUND OF THE INVENTION

1. Technical Field

The present invention relates in general to a method and system for data processing and in particular to a method and system for processing data input to a data processing system utilizing an input device having a number of keys. Still more particularly, the present invention relates to a method and system for translating keyboard scan codes into function and character codes which may be utilized by a number of data processing systems having diverse operating systems and input devices.

2. Description of the Related Art

Although a number of input devices such as mice, touch screens, and digitizing tablets have been recently developed to enhance user interface to data processing systems, the keyboard remains the primary device utilized to input data to data processing systems. A typical keyboard includes a number of keys, which are each associated with at least one character or function. For example, the enhanced keyboard commonly utilized with personal computers such as the IBM Personal System 2 (PS/2) has 101 keys, including alphanumeric character keys, key modifiers (Alt, Shift, Ctrl, etc.), cursor positioning keys, and 12 function keys (F1–F12).

In a typical personal computer system, keystrokes are detected by a microcontroller within the keyboard which continuously scans each of the keys to determine if a key has been pressed or released. When a change in the state of a key is detected, the microcontroller generates a unique scan code which specifies the key that has changed state and whether the key has been pressed (a make code) or released (a break code). The microcontroller within the keyboard then serially transmits the scan code generated by the keystroke, which is typically one or two bytes in length, to a keyboard driver within the system unit. The keyboard driver, in turn, issues an interrupt to the central microprocessor (CPU) indicating that a scan code is available to be read.

After the scan code generated by the keyboard microcontroller is read by the CPU, the CPU translates the scan code into an input code recognizable by the personal computer operating system utilizing a translation table within the Basic Input/Output System (BIOS) code stored in ROM. The translation table is arranged as a fixed length array in which a number of scan codes are stored in association with corresponding input codes. As will be understood by those skilled in the art, the translation table must supply a scan code translation for each combination of keyboard type and country layout (i.e., national language) supported by the personal computer system. Because a number of keyboard behaviors are unique to a specific country layout, the translation table typically includes hardcoded operating system-dependent commands in order to reduce the memory required to store the translation table. For example, translation tables may include operating system-dependent commands to translate scan codes input in conjunction with particular key modifiers (e.g., "a" with Caps Lock and Shift) for a particular country layout. After the CPU has translated the input scan code into an input code by referencing the translation table, the input code is processed in accordance with the operating system software executing within the CPU.

Although the conventional method of converting keyboard keystrokes into character and function input codes performs efficiently for a given combination of keyboard hardware, country layout, and operating system, a problem arises when the growing number of keyboard configuration and operating systems is considered. Since the translation table which converts scan codes into character and function input codes contains operating system-dependent special purpose code written specifically for each combination of country layout and keyboard hardware, the translation table is not transportable between data processing systems utilizing different operating systems and keyboard hardware. Thus, a translation table must be written for each permutation of operating system, country layout, and keyboard hardware.

Consequently, it would be desirable to provide a method and system for translating keyboard scan codes into function and character input codes, where the method and system may be utilized by data processing systems having diverse operating systems and keyboard hardware.

SUMMARY OF THE INVENTION

It is therefore one object of the present invention to provide an improved method and system for data processing.

It is another object of the present invention to provide an improved method and system for processing data input to a data processing system utilizing an input device having a number of keys.

It is yet another object of the present invention to provide a method and system within a data processing system for translating keyboard scan codes input into function and character codes independently of the operating system and keyboard hardware utilized by the data processing system.

The foregoing objects are achieved as is now described. A method and system are disclosed for processing input to a data processing system having a memory and an input device having a number of keys which represent associated characters and functions. According to the method of the present invention, a translation table is created within the memory for translating virtual key codes, which specify relative positions of associated keys, into corresponding input codes, which specify a character or function. The translation table enables virtual key codes to be translated into character codes independently of the operating system and input device utilized by the data processing system. In response to the detection of a selection of a key of the input device, a scan code representing the selected key is determined. The scan code representing the selected key is then converted into a virtual key code, which is translated into an input code utilizing the translation table. The input code is thereafter received for processing within the data processing system. Because the translation table converts virtual key codes into input codes independently of the operating system and input device utilized by the data processing system, the translation table may be utilized by a number of data processing systems having diverse operating systems and input devices.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a table defining keywords within the custom definition language utilized by the present invention within the translation table illustrated in FIG. 5.

DETAILED DESCRIPTION OF PREFERRED EMBODIMENT

Figure 1:
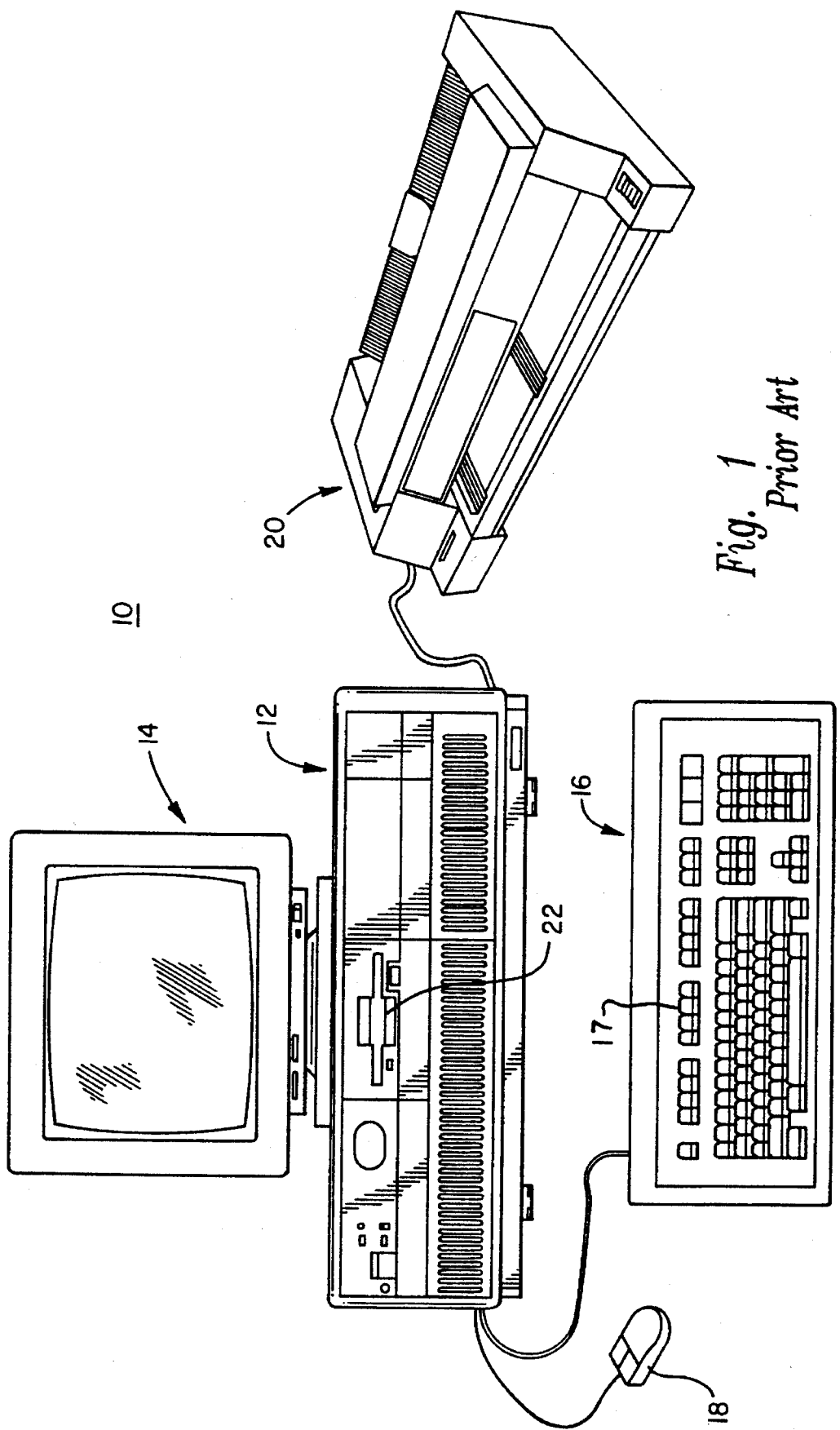
FIG. 1 illustrates a preferred embodiment of a data processing system utilizing the method and system of the present invention.

With reference now to the figures, and in particular with reference to FIG. 1, there is illustrated a preferred embodiment of a data processing system which employs the method and system of the present invention. As illustrated, data processing system 10 includes system unit 12, display device 14, keyboard 16, mouse 18, and printer 20.

As is well-known in the art, a user may input data to system unit 12 utilizing mouse 18, floppy disk drive 22, or keyboard 16, which in a preferred embodiment of the present invention comprises an enhanced keyboard having 101 keys 17. Keyboard 16 and mouse 18 are connected to system unit 12 via port A and port B connectors on the rear surface of system unit 12 (not illustrated). System unit 12 may output data to user via display device 14 or printer 20.

Figure 2:
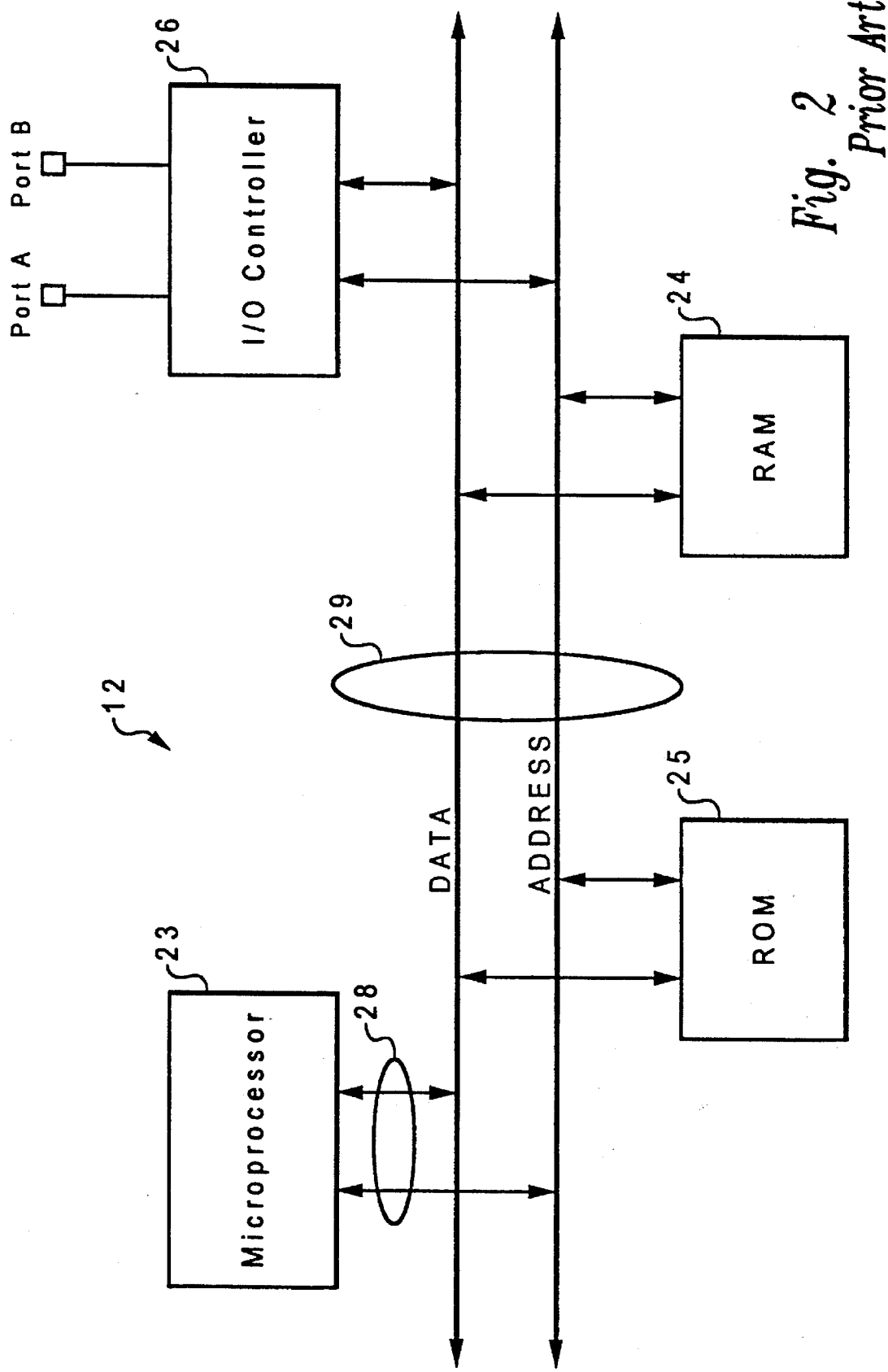
FIG. 2 depicts a block diagram of a preferred embodiment of the system unit of the data processing system illustrated in FIG. 1.

Referring now to FIG. 2, there is depicted a block diagram of system unit 12. As illustrated, system unit 12 includes microprocessor 23, which is coupled via local bus 28 and system bus 29 to volatile random access memory (RAM) 24 and nonvolatile read only memory (ROM) 25. ROM 25 stores power on/self test (POST) and basic input/output system (BIOS) software, which are utilized to boot system unit 12 and to provide transparent communication between system unit 12 and input/output (I/O) devices, such as display device 14, keyboard 16, and mouse 18. System unit 12 also contains I/O controller 26, which is coupled to keyboard 16 and mouse 18 via port A and port B connectors, respectively. As will be described in greater detail below with reference to FIG. 3, I/O controller 26 receives keystroke-generated scan codes from keyboard 16 and presents the scan codes to microprocessor 23 for further processing. As will be understood by those skilled in the art, system unit 12 also contains additional devices (not illustrated) such as a display adapter and parallel port adapter to interface display device 14 and printer 20 to data processing system 10.

Figure 3:
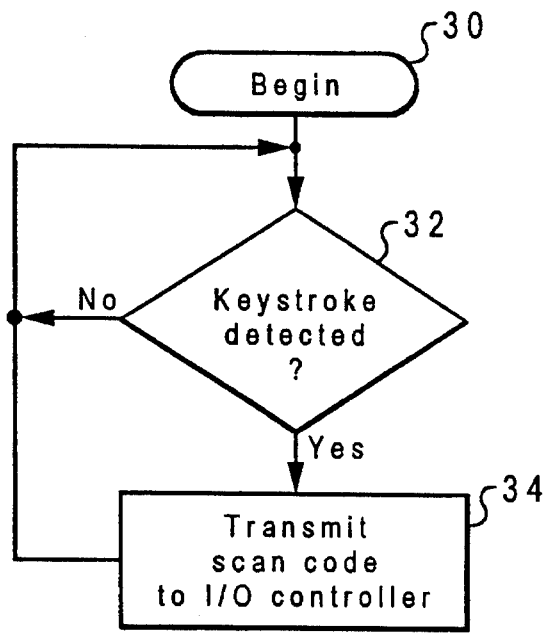
FIG. 3 illustrates a flowchart of a conventional method of generating keyboard scan codes utilized by a preferred embodiment of the present invention.

With reference now to FIG. 3, there is illustrated a flowchart of the conventional method utilized by a preferred embodiment of the present invention to generate scan codes in response to keyboard input. When the process begins at block 30, for example, on reset of data processing system 10, a microcontroller within keyboard 16 begins scanning keyboard 16 to detect if a key 17 has been pressed or released. The process proceeds from block 30 to block 32, which illustrates the keyboard microcontroller determining if a keystroke has been detected. If no keystroke has been detected, the process returns to block 32 and the keyboard microcontroller continues to scan keyboard 16. If, however, a keystroke has been detected, the keyboard microcontroller generates a scan code specifying which key 17 was pressed or released and transmits the scan code to I/O controller 26 within system unit 12. As will be appreciated by those skilled in the art, if more than one key is pressed simultaneously (e.g., Shift and "a"), keyboard 16 transmits a scan code corresponding to each key pressed. Thereafter, the process returns to block 32.

Figure 4:
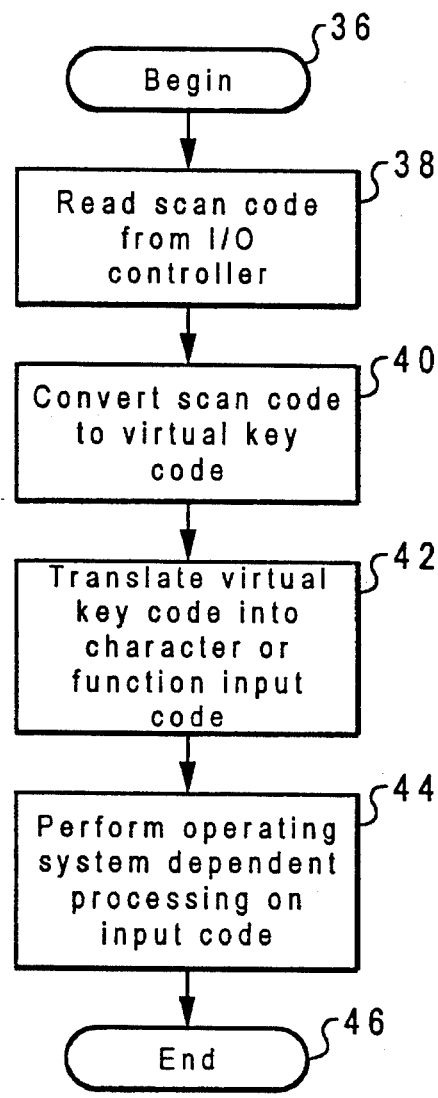
FIG. 4 depicts a flowchart of the method utilized by the present invention to translate keyboard scan codes into function and character input codes.

Referring now to FIG. 4, there is depicted a flowchart of the method utilized by the present invention to translate a scan code generated by the process illustrated in FIG. 3 into a function or character input code which may be utilized by the operating system of data processing system 10. As depicted, the process begins at block 36 when I/O controller 26 issues an interrupt to notify microprocessor 23 that a scan code has been received from keyboard 16. The process then proceeds to block 38, which illustrates microprocessor 23 reading the scan code from I/O controller 26 via local bus 28 and system bus 29.

Thereafter, the process proceeds to block 40, which depicts microprocessor 23 converting the scan code into a virtual key code. As will be understood by those skilled in the art, virtual key codes, such as those described by the International Organization for Standardization (ISO) keyboard positional notation, are a systematic method of describing the relative position of keys on a keyboard. In a preferred embodiment of the present invention, microprocessor 23 converts scan codes into ISO virtual key codes utilizing a conversion table stored within RAM 24 or ROM 25 that maps each scan code to a virtual key code; however, those skilled in the art will appreciate that other suitable keyboard notations and conversion techniques may be utilized. Because scan codes are device-dependent, a conversion table must be provided for each unique piece of keyboard hardware supported by data processing system 10.

The process proceeds from block 40 to block 42, which illustrates microprocessor 23 translating the virtual key code into a character or function input code which may be utilized by the operating system of data processing system 10. In a preferred embodiment of the present invention, the operating system of data processing system 10 comprises OS/2 Warp version 3.0, available from IBM Corporation. However, as will become apparent from the following description, the translation method employed by the present invention is operating system-independent, thereby enabling the present invention to be utilized by data processing systems running under a variety of operating systems.

Figure 5:
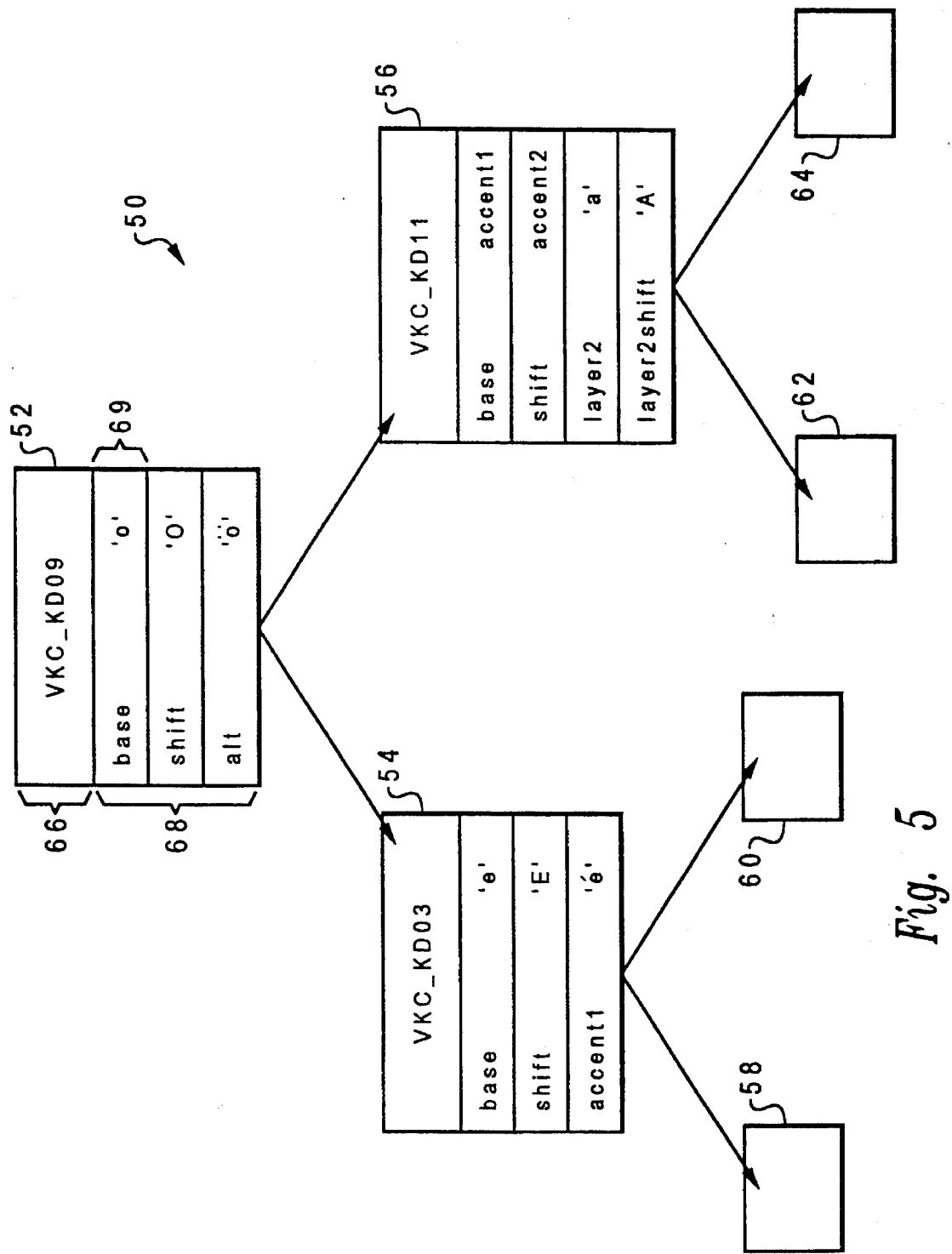
FIG. 5 illustrates a preferred embodiment of a translation table utilized to translate virtual key codes into function and character input codes.

With reference now to FIG. 5, there is illustrated a preferred embodiment of the translation table utilized by the present invention to translate virtual key codes into function and character input codes. As depicted in FIG. 5, translation table 50 is arranged as a binary tree which includes nodes 52–64. Each of nodes 52–64 stores a virtual key code key value 66 in association with a variable-length array of records 68. Each record 69 stores a character or function input code in association with a key modifier utilized to select the associated input code. For example, node 52 stores key value VKC_KD09, a virtual key code specifying a key position in ISO standard positional notation, in association with a three element array in which each record stores a permutation of the letter "o" in association with a key modifier. Thus, when a user strikes the key in position VKC_KD09, the operating system of data processing system 10 will receive the input code corresponding to lower case "o." If, however, the user strikes the key at position VKC_KD09 in conjunction with the Alt key, the operating system of data processing system 10 will receive an input code corresponding to "ö."

Referring now to FIG. 6, there is depicted a table defining keywords within the custom definition language utilized by the present invention within translation table 50. As is revealed by inspection of FIG. 6, most keywords within the custom definition language specify a particular key modifier. However, the custom definition language also includes the "include" and "#define" keywords. As will be appreciated by those skilled in the computer programming art, the keyword "include" is utilized, much like its counterpart in the C programming language, to specify the inclusion of other source files into the source file being processed. For example, in many applications it is desirable to store the ISO definitions of the virtual key codes in a separate data file and "include" them in the file storing translation table 50. The "#define" keyword is utilized to assign a numeric value to a specified virtual key code. Like the "include" keyword, the "#define" keyword is derived from the C programming language so that a common "#define" file can be utilized by multiple source code files.

Returning to FIG. 5, node 56 illustrates additional aspects of the custom definition language depicted in FIG. 6. First, node 56 illustrates the method utilized by the present invention to define "dead" keys, which are often utilized to modify alphabetic characters with diacritical marks such as acute() and grave () accents. As depicted in node 56, when a user strikes the key corresponding to virtual key code VKC_KD11 without a key modifier (i.e., base mode), the method of the present invention will add accent1 to the next character pressed. For example, if the key corresponding to virtual key code VKC_KD11 is pressed prior to the key corresponding to virtual key code VKC_KD03, the operating system will receive an input character code corresponding to "é." Node 56 also illustrates the function of the "layer" keyword, which is employed principally with country layouts such as Hebrew, Arabic, and Cyrillic that utilize non-Latin characters. Because these non-Latin country layouts require more characters and functions than may be accessed utilizing an enhanced keyboard, non-Latin country layouts include multiple layers of keyboard layouts definitions. For example, Cyrillic, Arabic, and Hebrew keyboard layouts may provide a user with access to both Latin and native typefaces by defining the first layer as a native layout and the second layer as a Latin character layout. Thus, as depicted in FIG. 5, when a user accesses the second layer of key definitions, for example, by striking the left shift and Alt keys together, and subsequently strikes the key corresponding to virtual key code VKC_KD11, the operating system receives the input character code corresponding to "a."

Returning to block 42 of FIG. 4, after microprocessor 23 has converted the scan code received from I/O controller 26 into a virtual key code at block 40, microprocessor 23 traverses translation table 50 in a well-known manner to locate the node corresponding to the virtual key code value 66. Once the correct node has been located, microprocessor 23 selects the input code within array 68 corresponding to the key modifier, if any, input together with the selected key. After the virtual key code is translated into an input code at block 42, the process proceeds to block 44, which depicts the operating system of data processing system 10 processing the input code. As will be understood by those skilled in the art, the processing performed by the operating system in response to receiving the input code depends upon the design of the operating system and other software executing within data processing system 10. For example, if a word processing application is executing within data processing 10, the operating system transmits an application program interface (API) message containing the input code to the word processing application. The word processing application then displays the corresponding character within display device 14. Thereafter, the process terminates at block 46.

Although the present invention has been described with reference to a preferred embodiment in which keyboard 16 is utilized to key input to data processing system 10, those skilled in the art will appreciate that the method and system of the present invention may be applied to data processing systems utilizing other keyed input devices. For example, the present invention is well-suited to systems utilizing a stylus and tablet with keyboard overlay or a touch screen upon which a keyboard graphic representation is displayed. Similarly, the present invention may be utilized within data processing systems that include mouthpiece input devices designed for use by mobility-impaired individuals.

In addition, although the present has been described with reference to a preferred embodiment of a data processing system in which the conversion between scan codes and virtual key codes and the translation between virtual key codes and input codes are performed by the microprocessor, those skilled in the art will appreciate that each of the steps within the method depicted in FIG. 4 may be realized utilizing a variety of hardware and software components a within data processing system. For example, in a second preferred embodiment of the present invention, the conversion of scan codes into virtual key codes and the translation of virtual key codes into input codes are each performed by special purpose logic devices rather than by the microprocessor.

While the invention has been particularly shown and described with reference to a preferred embodiment, it will be understood by those skilled in the art that various changes in form and detail may be made therein without departing from the spirit and scope of the invention.

What is claimed is:

1. A method of processing input to a data processing system having a memory and an input device having a plurality of keys, wherein each of said plurality of keys represents an associated character or function, said method comprising:

creating a translation table within said memory for translating a plurality of virtual key codes into a corresponding plurality of input codes independently of an operating system of said data processing system, wherein a particular virtual key code among said plurality of virtual key codes specifies a relative position of an associated one of said plurality of keys and wherein each of said plurality of input codes is associated with a character or function;

detecting a selection of a key among said plurality of keys;

in response to said selection, determining a scan code representing said selected key;

converting said scan code representing said selected key into a virtual key code;

translating said virtual key code into an input code utilizing said translation table; and receiving said input code for processing within said data processing system, wherein said translation table may be utilized by a plurality of data processing systems having diverse operating systems and input devices.

2. The method of processing input to a data processing system of claim 1, wherein said input device comprises a touch screen overlaying a display device and said plurality of keys are graphically displayed within said display device, wherein said step of detecting a selection of a key among said plurality of keys comprises detecting a touch of said touch screen at a point overlaying one of said plurality of keys.

3. The method of processing input to a data processing system of claim 1, wherein said step of converting said scan code representing said selected key into a virtual key code comprises converting said scan code representing said selected key into keyboard positional notation.

4. The method of processing input to a data processing system of claim 1, and further comprising:

creating a conversion table within said memory, wherein said conversion table stores each of a plurality of scan codes in association with one of said plurality of virtual key codes.

5. The method of processing input to a data processing system of claim 4, wherein said step of converting said scan code representing said selected key into a virtual key code comprises searching said conversion table to locate a virtual key code associated with said scan code representing said selected key.

6. A data processing system, comprising:

a memory;

an input device having a plurality of keys, wherein each of said plurality of keys represents an associated character or function;

a translation table within said memory for translating a plurality of virtual key codes into a corresponding plurality of input codes independently of an operating system of said data processing system, wherein each virtual key code among said plurality of virtual key codes specifies a relative position of an associated one of said plurality of keys and wherein each of said plurality of input codes is associated with a character or function;

means for detecting a selection of a key among said plurality of keys;

means, responsive to said selection, for determining a scan code representing said selected key;

means for converting said scan code representing said selected key into a particular virtual key code;

means for translating said particular virtual key code into an input code utilizing said translation table; and means for receiving said input code for processing within said data processing system, wherein said translation table may be utilized by a plurality of data processing systems having diverse operating systems and input devices.

7. The data processing system of claim 6, wherein said means for converting said scan code representing said selected key into a virtual key code comprises means for converting said scan code representing said selected key into keyboard positional notation.

8. The data processing system of claim 6, wherein said translation table comprises a tree-like data structure including a plurality of nodes, said plurality of nodes each associated with a virtual key code, wherein each of said plurality of nodes is arranged as an array of records and wherein each record within an array associates an input code with a particular state of said input device.

9. The data processing system of claim 6, and further comprising:

means for creating a conversion table within said memory, wherein said conversion table stores each of a plurality of scan codes in association with one of said plurality of virtual key codes.

10. The data processing system of claim 9, wherein said means for converting said scan code representing said selected key into a virtual key code comprises means for searching said conversion table to locate a virtual key code associated with said scan code representing said selected key.

11. A computer program product for use with a data processing system including a memory and an input device having a plurality of keys, wherein each of said plurality of keys represents an associated character or function, said computer program product comprising:

a computer-usable media;

computer readable code in said computer-usable media for causing said data processing system to convert a scan code representing a selected key among said plurality of keys of said input device into a virtual key code that specifies a relative position of said selected key among said plurality of keys; and said computer readable code in said computer-usable media further causing said data processing system to translate said virtual key code into a corresponding input code utilizing a translation table within said memory, wherein said translation table is independent of an operating system of said data processing system, and wherein said corresponding input code is associated with a character or function.

12. The computer program product of claim 11, wherein said computer readable code in said computer-usable media for causing said data processing system to convert said scan code representing said selected key into a virtual key code comprises computer readable code for causing said data processing system to convert said scan code representing said selected key into keyboard positional notation.

13. The computer program product of claim 11, wherein said computer readable code in said computer-usable media for causing said data processing system to convert said scan code representing said selected key into a virtual key code comprises computer readable code for causing said data processing system to search a conversion table to locate a virtual key code associated with said scan code representing said selected key.

\* \* \* \* \*